(12) United States Patent
Beardsworth et al.

(10) Patent No.: US 12,233,553 B2
(45) Date of Patent: Feb. 25, 2025

(54) ROBOT INSTRUCTION DISTRIBUTION FRAMEWORK

(71) Applicant: Intrinsic Innovation LLC, Mountain View, CA (US)

(72) Inventors: Michael Beardsworth, San Francisco, CA (US); Steve Wolter, Munich (DE); Nicholas Julian Cox, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 301 days.

(21) Appl. No.: 17/347,996

(22) Filed: Jun. 15, 2021

(65) Prior Publication Data

US 2022/0395977 A1 Dec. 15, 2022

(51) Int. Cl.
*B25J 9/16* (2006.01)
*G06F 16/2458* (2019.01)

(52) U.S. Cl.
CPC ........ *B25J 9/1656* (2013.01); *G06F 16/2471* (2019.01)

(58) Field of Classification Search
CPC ...... B25J 9/1656; B25J 9/1661; B25J 9/1658; B25J 9/1671; B25J 9/1664; B25J 9/0081; B25J 9/00; B25J 9/16; B25J 9/161; B25J 9/163; B25J 9/1669; B25J 9/1692; G06F 16/2471; G06F 11/1008; G06F 11/1076; G06F 3/0601; G06F 16/182; G05B 2219/40391; G05B 2219/40419; G05B 19/42; G05B 19/423
See application file for complete search history.

(56) References Cited

U.S. PATENT DOCUMENTS

| 7,353,082 B2 | 4/2008 | Pretlove et al. |
| 8,644,984 B2 | 2/2014 | Nagatsuka et al. |
| 8,868,241 B2 | 10/2014 | Hart et al. |

(Continued)

FOREIGN PATENT DOCUMENTS

| CN | 111752638 A | * 10/2020 |
| KR | 101284910 | 12/2012 |

OTHER PUBLICATIONS

Gao et al., "Real-time hybrid adaptive fuzzy control of a SCARA," 2001 European Control Conference, Sep. 2001, 6 pages.

(Continued)

*Primary Examiner* — Adam R Mott
*Assistant Examiner* — Byron Xavier Kasper
(74) *Attorney, Agent, or Firm* — Fish & Richardson P.C.

(57) ABSTRACT

Methods, systems, and apparatus, including computer programs encoded on a computer storage medium that distributes skill bundles that can guide robot execution. One of the methods includes receiving data for a skill bundle from a skill developer. The data can include a definition of one or more preconditions for a robotic system to execute a skill; one or more effects to an operating environment after the robotic system has executed the skill; and a software module implementing the skill. The software module can define a state machine of subtasks. A skill bundle can be generated from the data received from the skill developer. Data identifying the generated skill bundle can be added to a skill registry. The skill bundle can be provided to the execution robot system for installation on the robot execution system.

20 Claims, 4 Drawing Sheets

(56) References Cited

U.S. PATENT DOCUMENTS

| | | | |
|---|---|---|---|
| 9,102,061 B2 | 8/2015 | Schmirgel et al. | |
| 9,110,466 B2 | 8/2015 | Yanagawa et al. | |
| 9,393,687 B2 | 7/2016 | Hietmann et al. | |
| 9,561,590 B1* | 2/2017 | Nusser | B25J 9/1661 |
| 9,840,007 B1* | 12/2017 | Kuffner | B25J 9/1671 |
| 10,279,476 B2 | 5/2019 | Jaekel et al. | |
| 10,977,576 B2* | 4/2021 | Namie | G05B 13/041 |
| 11,597,079 B2* | 3/2023 | Imai | B25J 9/1697 |
| 2013/0275091 A1 | 10/2013 | Peterson et al. | |
| 2017/0282374 A1* | 10/2017 | Matula | B25J 3/00 |
| 2017/0348854 A1* | 12/2017 | Oleynik | A47J 47/02 |
| 2020/0118222 A1* | 4/2020 | Bidram | G05B 19/41865 |
| 2021/0060774 A1 | 3/2021 | Butterfoss et al. | |
| 2021/0187742 A1* | 6/2021 | Ozeki | B25J 9/161 |
| 2021/0213611 A1* | 7/2021 | Tsuboi | B25J 9/1661 |
| 2022/0288777 A1* | 9/2022 | Harms | B25J 9/1661 |

OTHER PUBLICATIONS

International Search Report and Written Opinion in International Appln. No. PCT/US2022/018261, dated Jun. 13, 2022, 16 pages.
International Preliminary Report on Patentability in International Appln. No. PCT/US2022/018261, dated Dec. 28, 2023, 9 pages.
Farinelli et al., "Design and Implementation of Modular Software for Programming Mobile Robots," International Journal of Advanced Robotic Systems, Mar. 2006, pp. 037-042.

* cited by examiner

ROBOT INSTRUCTION DISTRIBUTION FRAMEWORK

BACKGROUND

This specification relates to robotics, and more particularly to programming robotic movements.

Robotics control refers to controlling the physical movements of robots to perform tasks. For example, an industrial robot that builds cars can be programmed to first pick up a car part and then weld the car part onto the frame of the car. Each of these actions can themselves include dozens or hundreds of individual movements by robot motors and actuators.

Robotics planning has traditionally required immense amounts of manual programming to meticulously dictate how the robotic components should move to accomplish a particular task. Manual programming is tedious, time-consuming, and error prone. In addition, programming that is manually generated for one workcell can generally not be used for other workcells, sites, facilities, or other organizations.

In this specification, a workcell is the physical environment in which a robot will operate. Workcells have particular physical properties, e.g., physical dimensions that impose constraints on how robots can move within the workcell. Thus, manual programming developed for one workcell is generally incompatible with a workcell having different robots, a different number of robots, different physical dimensions, or operated by a different entity.

SUMMARY

This specification describes technologies relating to distributing skill bundles that guide robot operation. In particular, the specification describes how a skill bundle distribution system can distribute skill bundles, which enable robots to be programmed to perform one or more robotic tasks.

In this specification, a task refers to a capability of a particular robot that involves performing one or more subtasks. For example, a connector insertion task is a capability that enables a robot to insert a wire connector into a socket. This task can be described as including two subtasks: 1) move a tool of a robot to a location of the socket, and 2) insert the connector into the socket at the particular location.

In this specification, a subtask is an operation to be performed by a robot using a tool. For brevity, when a robot has only one tool, a subtask can be described as an operation to be performed by the robot as a whole. Example subtasks include welding, glue dispensing, part positioning, and surface sanding, to name just a few examples. Subtasks are generally associated with a type that indicates the tool required to perform the subtask, as well as a location within a coordinate system of a workcell at which the subtask will be performed.

In this specification, a skill is a collection of data and software that enables a robot to accomplish a task or a subtask. A skill can have associated one or more skill implementations.

Particular embodiments of the subject matter described in this specification can be implemented so as to realize one or more of the following advantages.

The techniques described in this specification can simplify the process of programming robots by providing access to reusable skill bundles.

The techniques described in the specification can further simplify the process of programming robots by providing access to parameterized skill bundles. The use of parameters can allow a skill bundle to be used by a broader set of robots without the need to create custom programming for each robot.

In addition, techniques described in the specification can ensure the provenance of a skill bundle through the use of encryption technologies. Ensuring the provenance of a skill bundle reduces the likelihood that a malicious skill bundle will damage a robot.

These techniques can enable automated reasoning across compositions of skill bundles, allowing identification of errors without requiring execution by a robot. Early identification of errors can reduce implementation time and can avoid unsafe robot behavior.

One aspect features receiving data for a skill bundle from a skill developer. The data can include a definition of one or more preconditions for a robotic system to execute a skill; one or more effects to an operating environment after the robotic system has executed the skill; and a software module implementing the skill. The software module can define a state machine of subtasks. A skill bundle can be generated from the data received from the skill developer. Data identifying the generated skill bundle can be added to a skill registry. The skill bundle can be provided to the execution robot system for installation on the robot execution system.

One or more of the following features can be included. The robot execution system can receive an input program that references one or more skill bundles, and execute at least one software module implementing a skill included in the one or more skill bundles referenced by the input program. The robot execution system can determine one or more skill bundles referenced by the input program. The robot execution system can identify a skill bundle among the one or more skill bundles determined to be referenced by the input program that is not downloaded to the robot execution system. In response to determining that an identified skill bundle is not downloaded to the robot execution system, the robot execution system can download the identified skill bundle. The robot execution system can receive an input program that references a plurality of skill bundles, including a first skill bundle specifying a particular result and a second skill bundle having a precondition that references the particular result. The robot execution system can execute at least one software module specified by the plurality of skill bundles. The robot execution system can execute the first skill using a first skill template of the first skill bundle. The robot execution system can determine that a result of the first skill satisfies the precondition of the second skill bundle. In response, the robot execution system can transition from executing the first skill to executing the second skill according to the input program. The skill bundle can include a reference to at least one software module capable of completing at least one of the subtasks. The skill bundle can includes at least a first skill bundle and a second skill bundle. At least one effect of the first skill bundle can satisfy at least one precondition of the second skill bundle. The robot execution system can execute a first software module included in the first skills bundle. In response to the robot execution system executing the first software module, the robot execution system can execute a second software module included in the second skills bundle.

The details of one or more embodiments of the subject matter of this specification are set forth in the accompanying drawings and the description below. Other features, aspects,

BRIEF DESCRIPTION OF THE DRAWINGS

Like reference numbers and designations in the various drawings indicate like elements.

DETAILED DESCRIPTION

Figure 1:
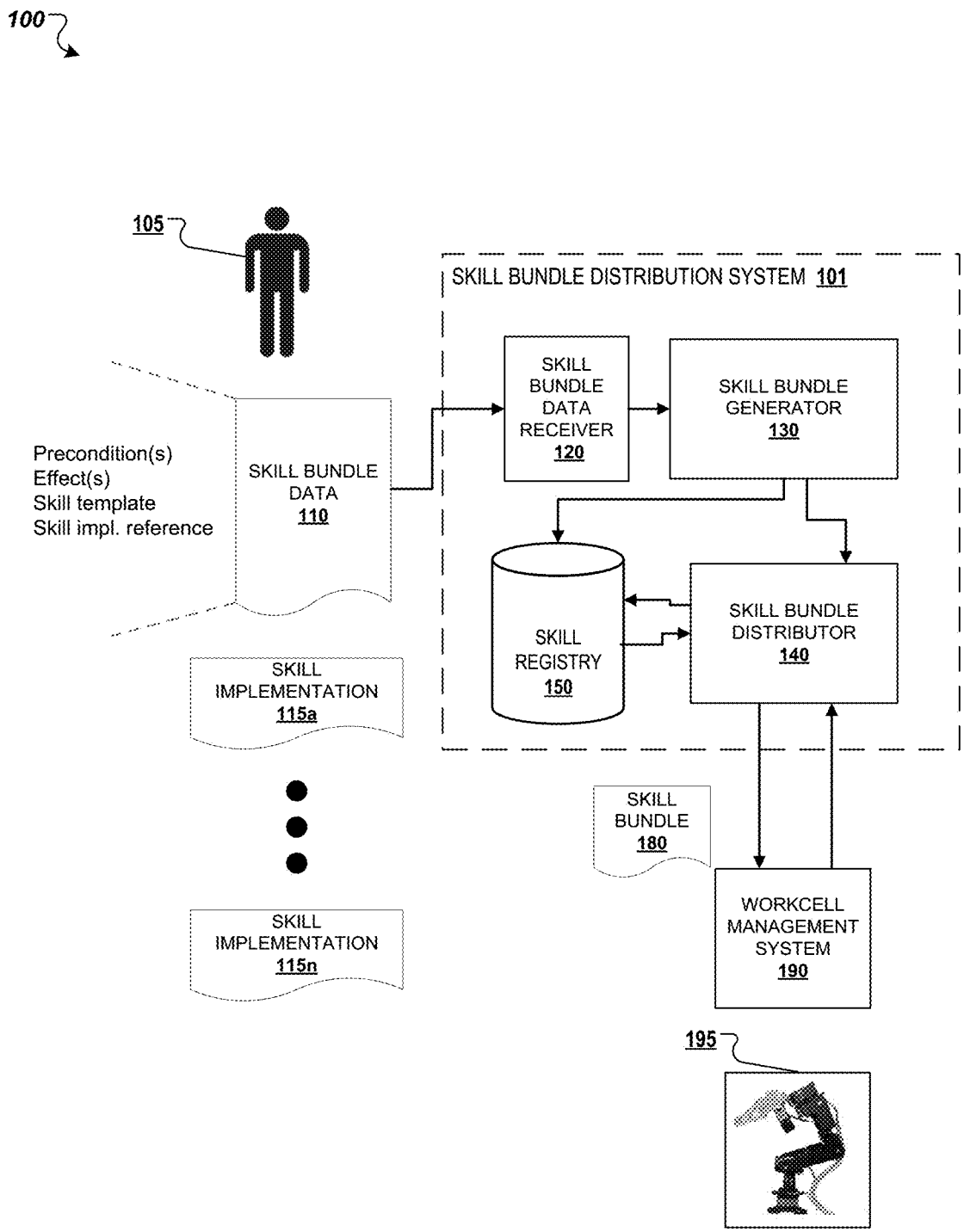
FIG. 1 is a block diagram of an example skill bundle distribution system.

FIG. 1 is a block diagram of an example skill bundle distribution system 101.

A purpose of a skill bundle distribution system 101 can be to acquire data from one or more robot skill developers 105 that is useful in democratizing and simplifying the chore of programming a robotic system. A skill bundle distribution system 101 can package the data into skill bundles 180, and provide the skill bundles 180 to other robot skill developers 105 or to workcell management systems 190. A skill bundle can be installed on and executed by a robot execution system such as a workcell management system 190 or one or more robots 195 associated with the workcell management systems 190.

In this specification, a skill bundle is a collection of data containing information necessary to configure for a robot to accomplish one or more tasks. A skill bundle can contain one or more skill templates that define the set of skills necessary to complete the task or subtask, and can further include skill implementations necessary to execute the skills, or references to the skill implementations.

A skill bundle can also include text descriptive of the skill bundle, for example, explaining what the skill bundle does, what prerequisites it requires, the effects it will produce, and so on. Descriptive text can aid users in locating a skill bundle appropriate for a particular need.

A skill bundle can additionally include other metadata such as the date it was created, the last update date, the creator(s), identifiers associated with one or more validators (described further below), and so on.

A skill bundle can further contain a list of skill preconditions and skill effects. A precondition can be a prerequisite to successfully performing a task, such as a robotic arm being present and in a defined start position. Effects can be conditions that will exist after successful execution of a task, such as a robotic arm grasping an item or being present at a particular coordinate in the workcell. Preconditions and effects are described further in reference to FIG. 3.

A skill bundle can also include parameters that configure the execution of one or more skills implementations (described below) present in the skill bundle. For example, a skill implementation that guides a robot arm to lift a payload can be executed by robot arms with varying maximum lift capacities. A skill bundle for a particular model of robot arm can contain a maximum lift capacity for that robot arm model. The skill implementation can be programmed to check the weight of the payload against the parameterized maximum lift capacity before attempting to lift the payload, thus protecting the robot arm against potential damage caused by an excessively heavy payload. In this way, parameters in a skill bundle permit broader reuse of skill implementations, simplifying the development process.

A skill bundle can be digitally signed. For example, the creator of a skill bundle can create a digital signature by encrypting the skill bundle with a private key and publishing the creator's corresponding public key. Optionally, to deter tampering with the skill bundle, a checksum can be included in the encrypted skill bundle. By decrypting the skill bundle with the public key, a user of the skill bundle can confirm the identity of the creator and (optionally) the checksum.

In addition or alternatively, the skill bundle distribution system 101 (described further below) can encrypt the skill bundle with a private key and publish the skill bundle distribution system's corresponding public key. For example, before including a skill bundle in the skill bundle distribution system 101, the skill bundle distribution system can verify the skill bundle. The skill bundle distribution system 101 can exclude skill bundles that are not properly verified. If the skill bundle distribution system 101 detects a verification error, skill bundle distribution system 101 can provide an error indicator to a user, to a logging system or to another recipient.

The skill bundle distribution system can limit execution of skill bundles to only authorized users. For example, a skill bundle can be encrypted with a secret key that is provided only to authorized users of the skill bundle. Unauthorized users of the skill bundle would lack the ability to decrypt, and therefore to use, the skill bundle. Skill bundles can also be encrypted with both private and secret keys in various combinations.

A skill bundle can contain other skill bundles. For example a skill bundle for a composite task, such as inserting a connector, can include two skill bundles, one that positions a robot arm holding a connector, and one that uses the robot arm to insert the connector. Such composition of skill bundles additionally simplifies the task of robot programming.

A skill template, or for brevity, a template, is a collection of data and software that allows a robot to be configured to perform a particular task. A skill template can represent one or more skills required to accomplish the task as well as information, such as a state machine, describing the order in which the skills are to be performed, including conditional and iterative execution of one or more skills. A skill template can also describe other behavior, such as how errors are to be handled. For example, a skill template can relate to inserting a connector into a housing. The skills required to insert a connector might be "align robot arm" and "insert connector." The order in which those skills must be performed—first align the arm, then insert the connector—is also included in the skills bundle. The actions that should occur in response to encountering an error while executing of one or more of the skills, such as "no connector available" or "arm cannot be aligned", can also be defined in the skill template. Such actions might include transmitting an error message to an administrative console then terminating execution of the skill template.

A skill implementation can be one or more software instructions that, when executed by a robot, cause the robot to perform the skill. A skill implementation can be encoded using a programming language such as Python or C++. A skill implementation can also utilize APIs (application programming interfaces) and runtime support provided by one or more robot execution environments or directly from a robot.

Optionally, the skill implementation can also include the runtime environment necessary to execute the skill. Also optionally, the skill implementation and/or the runtime environment (such a complete operating system and all middleware required to perform a skill) can be packaged as a container image or in an alternate image format.

A skill bundle distribution system 101 can include a skill bundle data receiver 120, a skill bundle generator 130, a skill bundle distributor and a skill registry 150. The skill bundle distribution system 101 can be implemented as one or more computer programs on one or more computers in one or more locations, in which the systems, components, and techniques described below can be implemented.

The skill bundle data receiver 120 component of a skill bundle distribution system 101 can accept from one or more users 105 skill bundle data 110 to be associated with a skill bundle 180. Skill bundle data can include one or more preconditions, one or more effects, one or more skill templates, one or more skill implementation references and additional data, as described above. In an alternate implementation, a skill implementation (115a-115n) can be included in addition to a skill implementation reference or instead of the skill implementation reference. The skill bundle data can also include one or more skill bundles that can be aggregated to create composite skill bundles, for example, to perform more complex tasks.

A skill template can be represented using any appropriate form such as a structured document format (e.g., an XML format) or a programming or scripting language designed to express a skill template.

A skill implementation reference can contain data that can be used to locate one or more implementations of a skill. For example, if the skill implementation is stored on a web server, the skill implementation reference can be a URI. If the skill implementation is stored in a database, the skill implementation reference can be primary key. If the skill implementation is stored in a file system, the skill implementation reference can be a fully-qualified path.

The skill bundle generator 130 can receive the skill bundle data 110 from the skill bundle data receiver 120 and create a skill bundle 180.

The skill bundle generator 130 can encode a skill bundle 180 in any appropriate format, such as a structured document format (e.g., XML), as unstructured text, or in a binary format.

The skill bundle generator 130 creates the skill bundle 180 by adding data included in the skill bundle data 110 to the skill bundle 180. In cases where the skill bundle data 110 includes a reference to additional data, the skill bundle generator 130 can include the reference in the skill bundle 180, retrieve the information associated with the reference and include the information, or include both the reference and the associated information.

Optionally, the skill bundle distribution system 101 can include default values for data included in a skill bundle 180. For example, a default precondition for a robot arm can be that the arm is in a particular initial position. In cases where the skill bundle data 110 does not include a value, and the skill bundle distribution system 101 has a configured default value, the skill bundle generator 130 can include the default value in the skills bundle 180.

The skill bundle generator 130 can store skill bundles 180 in a skill registry 150. A skill registry 180 can be any storage mechanism capable of storing skill bundles 180. For example, a skill registry can be a file system or a database configured to store skill bundles 180. In some implementations, the skill registry 150 uses multiple storage mechanisms stored at one or more physical locations. For example, the skill registry 150 can be a distributed database that is spread across multiple computers that are potentially separated geographically by large distances.

The skill bundle generator 130 can also send to the skill bundle distributor 140 an indication that the skill bundle generator 130 stored a skill bundle 180 in the skill registry 150. The skill bundle generator 130 can also send to the skill bundle distributor information about the skill bundle 180, such as preconditions and effects, which can allow the skill bundle distributor 140 to respond to some queries without searching the skill registry 150, therefore making the search more efficient.

Optionally, the skill bundle generator 130 can validate the skill bundle data before creating and storing the skill bundle. For example, if the skill bundle data describes a complex task and contains two skill bundles that describe each of two component tasks required to complete the complex task, and those two skill bundles have contradictory preconditions, the skill bundle generator 130 can produce an error indicator. An example of contradictory precondition can include "robot gripper open" and "robot gripper closed." In such cases, in some implementations, the skill bundle generator 130 can attach the error indicator to the new, composite skill bundle; in some implementations, the skill bundle generator 130 can terminate without producing and storing the new skill bundle. The skill bundle generator 130 can, optionally, perform other validation tasks.

The skill bundle distributor 140 can be responsible for accepting requests for skill bundles from workcell management systems 190 or from users or programmers of robot systems, and for returning skill bundles that match the request.

A request for a skill bundle can include a description of the skill bundle requested. The description can be a unique indicator of a particular skill bundle such as numeric or alphanumeric descriptor. The descriptor can also be a set of criteria that a matching skill bundle must satisfy. For example, it might specify all skill bundles capable of gripping an object of a given shape and weight. The skill descriptor can be considered a template that describes any matching skill bundle.

The skill bundle distributor 140 can determine which skill bundles match the skill bundle request, and return the one or more matching skill bundles to the requestor, which can include a workcell management system 190 or a user. Skill bundle matching is described further in reference to FIG. 2. The workcell management system 190 can execute the skill bundle 140 or install it on a robot 195 for execution by the robot 195.

The skill bundle distribution system 101 can be used by a programmer to simplify the task of programming robotic systems. For example, a programmer tasked with developing a robot program that causes one or more robots to place a metal item at a particular location then weld that item in place would typically write software code that accomplishes all required robot actions. Instead, using the skill bundle distribution system, the programmer could write software code that downloads two skills, one for placing the metal item and one for welding the item, and causes the robot to perform those skills. Those skills can be provided to the skills distribution system by any developer sufficiently proficient in skill development to provide a valid implementation. In addition, each skill can be developed independently and potentially supplied to the skill bundle distribution system by different developers at different times and at different locations. Users of the skill distribution system need only retrieve from the skill distribution system skills with the appropriate preconditions and effects, and need not provide implementations of the skills, thus reducing the complexity of developing robot programs.

Figure 2:
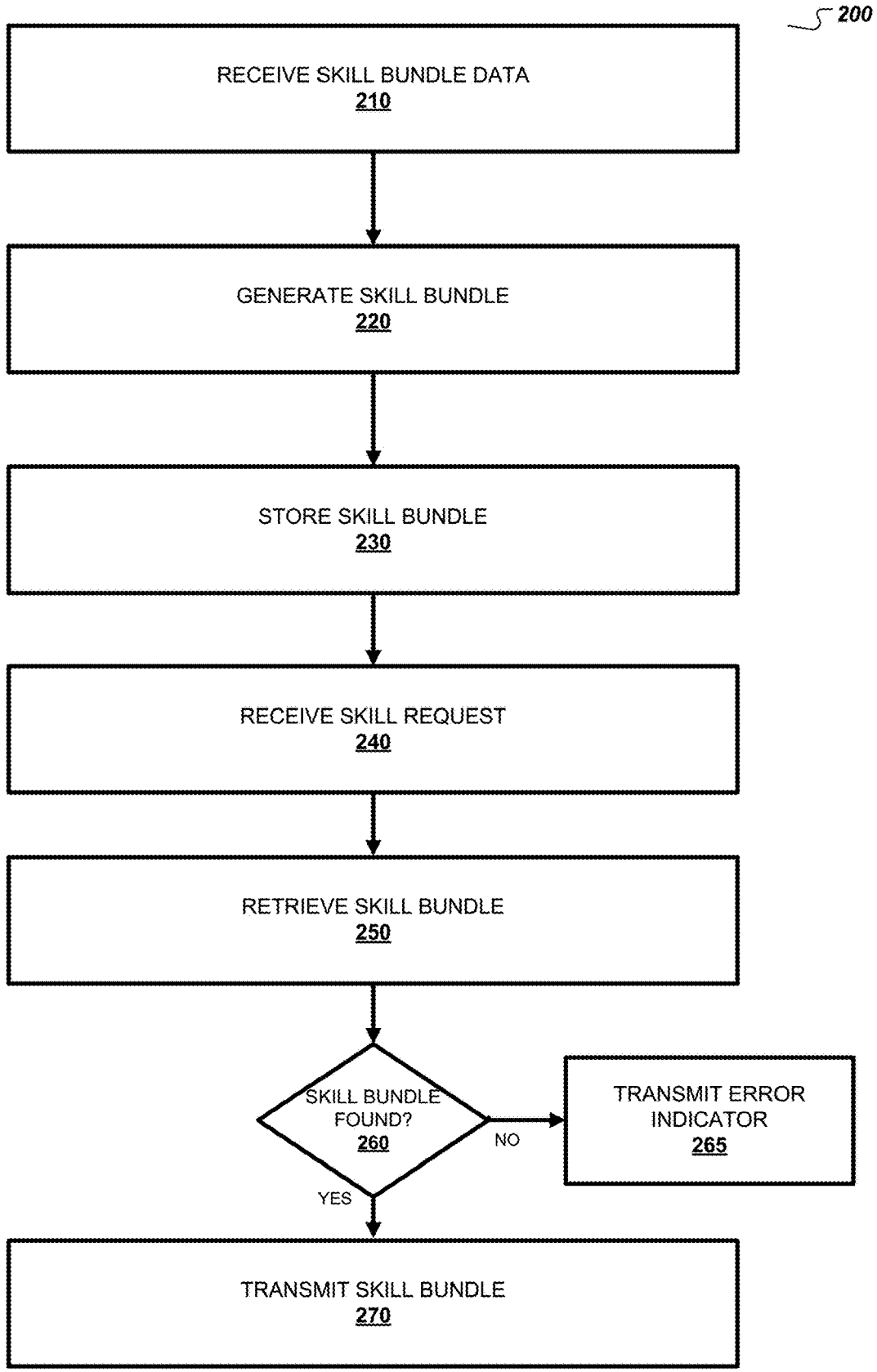
FIG. 2 is a flow diagram of an example process to distribute skill bundles.

FIG. 2 is a flow diagram of an example process to distribute skill bundles. For convenience, the process 200 will be described as being performed by a system of one or more computers located in one or more locations. For example, the skill bundle distribution 101 of FIG. 1, appropriately programmed in accordance with this specification, can perform the process 200.

In step 210, the system receives skill bundle data. The skill bundle data can be received using any method appropriate for receiving data. For example, the skill bundle data can be received using an HTTP connection, using a local or remote procedure or method call, using a web service invocation, streamed over TCP/IP, and so on.

In step 220, the system generates a skill bundle. As described in reference to FIG. 1, a skill bundle 180 can be encoded in any appropriate format, such as a structured document format (e.g., XML), an unstructured text, or a binary format, and the system generates the bundle according to the format. For example, if the skill bundle is encoded as XML, the XML, can have outer tags such as <SkillBundle> . . . </SkillBundle>, with inner tags indicating the inner components. The preconditions can be encoded as <Preconditions> . . . </Preconditions>, with each precondition within the preconditions section encoded as <Precondition> . . . </Precondition>. The effects can be encoded as <Effects> . . . </Effects>, with each effect within the effects section encoded as <Effect> . . . </Effect>. Other components of the skill bundle can be encoded analogously.

In step 230, the system stores the skill bundle. As described in reference to FIG. 1 a skill bundle can be stored on any appropriate storage device. For example, if the skill bundle is stored on a file system (local or remote), the system can perform step 230 by using file system operations that store data in the file system. The system stores the skill bundle using commands appropriate for the storage device used to store the skill bundles.

In step 240, the system receives a request for a skill bundle. The skill bundle request (or for brevity, request) can include an indication of a specific skill bundle requested, for example, a unique identifier for the skill bundle. The request can also include criteria that one or more matching skill bundles must satisfy. For example, the criteria can include one or more preconditions and/or one or more effects, or the criteria might specify all skill bundles that accomplish a given task, such as inserting a connector of a particular type. In addition, the criteria can include wildcard indicators that can match all or part of a component of a skill bundle as described further below.

In step 250, the system retrieves one or more skill bundles that match the criteria specified in the request received in step 240.

In some implementations, the system searches the skill registry for skill bundles that match the fields specified in the request. For example, if the request specifies an "arm movement" skill with precondition "CurrentPosition=Home", the system will only retrieve skills bundles with both the "arm movement" skill and the CurrentPosition set to "Home."

In some implementations, the system can match wildcards. For example, the precondition "CameraSensor=Video*" (where '*' is a wildcard character) can match both "CameraSensor=VideoHD" (high definition) and "CameraSensor=VideoSD" (standard definition).

In alternate implementations, empty fields in the request can be treated as wildcards, matching all skills bundles. In other implementations, empty fields can be matched only with skills templates that have corresponding empty fields.

Figure 4:
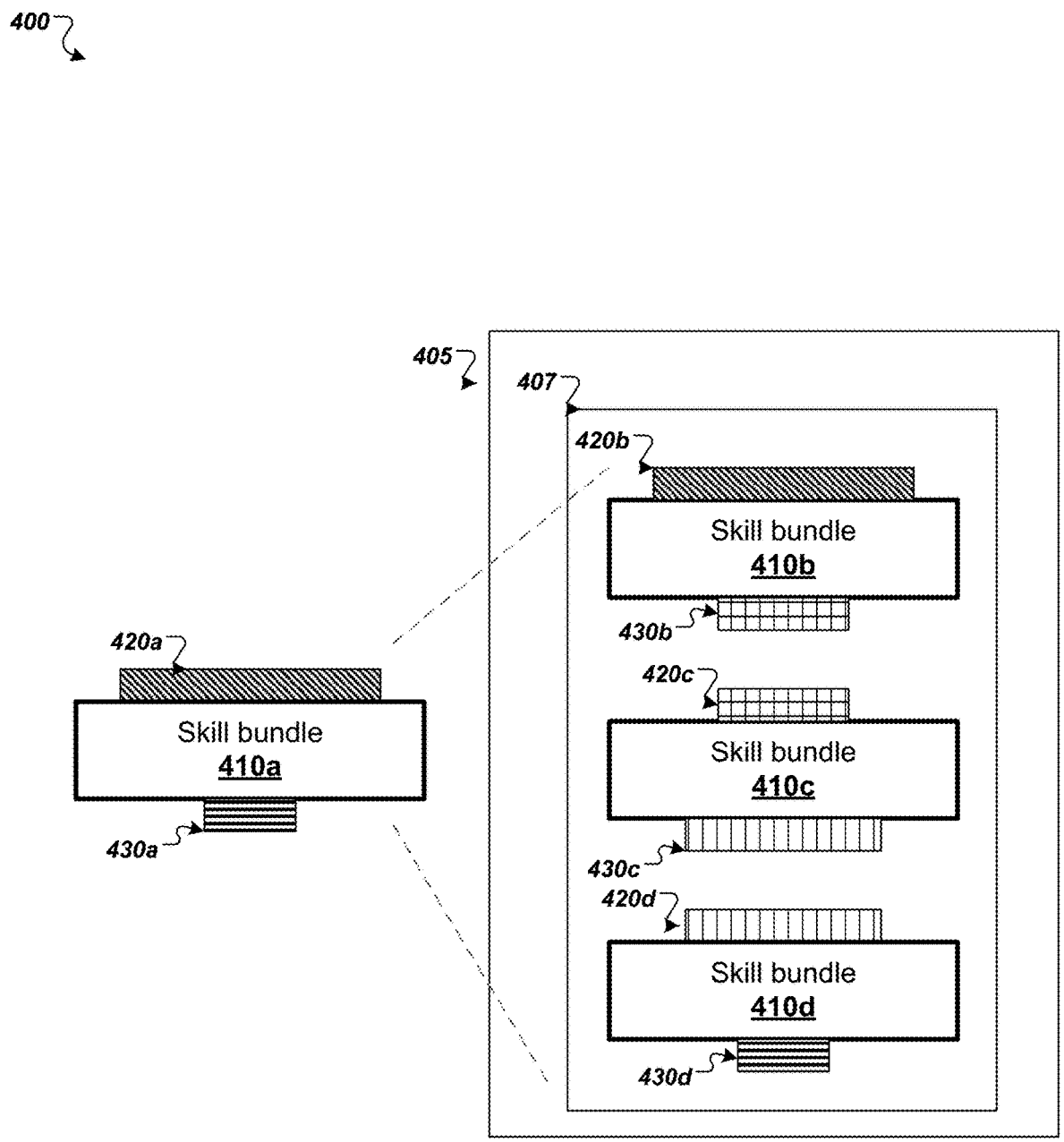
FIG. 4 is a block diagram of an example skill bundle chain.

In some implementations, when no single skills bundle matches the requested skills bundle, the system can attempt to assemble a chained skills bundle, as described further in reference to FIG. 4.

The system can perform the retrieval by evaluating each skill bundle in the skill registry to determine which skill bundles match the request. Alternatively, the system can store the skill bundles in a relational database, create a SQL query that specifies the criteria present in the request, and execute the SQL against the relational database. Alternate approaches to matching skill requests and skill bundles present in the skill registry can also be used.

If the system determines that multiple skill bundles satisfy the skill bundle request, the skill bundle distributor can send, for example, all matching skill bundles, the first matching skill bundle, or a subset of the matching skill bundles (for example, the first N matching skill bundles 180 for some configured value of N or a value of N specified in the request).

In decision step 260, the system determines whether at least one skill bundle has been found. If no bundles were found, the system proceeds to step 265; if one or more bundles are found, the system proceeds to step 270.

In step 265, the system has determined that no matching skill bundles have been found and transmits an error indicator. The error indicator can be an empty or null response to the received skill request of step 240, or a designated error value such as "#ERROR" or "4." The error indicator can also be an exception message. The system can also transmit more than one such error indicators or alternate indicators of the error(s).

In step 270, the system transmits the skill bundle found to match the skill bundle request. The system can transmit the skill bundle using any appropriate data transmission protocol. For example, the system can transmit the skill bundle over an HTTP connection, using a local or remote procedure or method call, a web service invocation, by streaming over TCP/IP, and so on.

Figure 3:
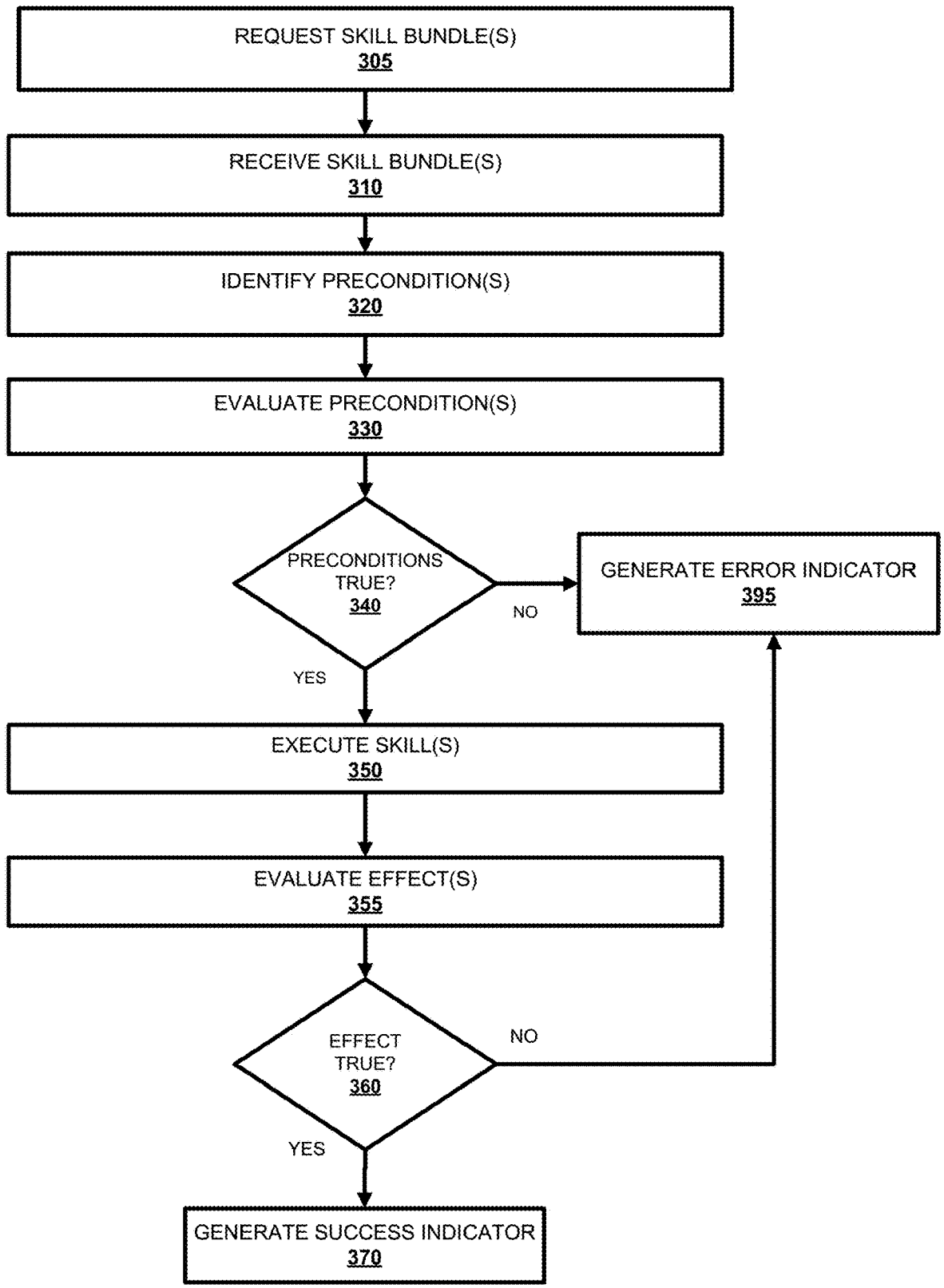
FIG. 3 is a flow diagram of an example process to execute skill bundles.

FIG. 3 is a flow diagram of an example process to execute skill bundles. The diagram shows a potential use in a robot environment of skill bundles described in this specification. For convenience, the process 300 will be described as being performed by a system of one or more computers located in one or more locations. For example, the workcell management system of FIG. 1, appropriately programmed in accordance with this specification, can perform the process 300.

In step 305, a workcell management system (or an alternate requestor), requests a skill bundle, and in step 310, the workcell management system receives from the skill bundle distribution system a skill bundle in response to the request made in step 305. Skill bundle requests and responses were previously described in reference to FIG. 2.

In step 320, the workcell management system identifies preconditions contained in the skill bundle(s) received from the skill bundle distribution system in step 310. For example, if the skill bundle is encoded in XML as described in reference to FIG. 2, the workcell management system can identify the preconditions by extracting the elements tagged by <Precondition> . . . </Precondition>.

In step 330, the workcell management system evaluates the precondition(s). A precondition can be expressed as an assertion. For example, "MaxLiftWeightKg>=10" can indicate that a robot is capable of lifting at least 10 kilograms; "ArmPosition=Resting" can indicate that a robot arm is in resting position; "CameraResolutionMP=32" can indicate that a camera is capable capturing 32 megapixel images; and so on. The workcell management system can evaluate each precondition against the current status and capabilities of the relevant components in the workcell.

In decision step 340, the workcell management system determines whether the preconditions are true. If at least one precondition is not true, the workcell management system proceeds to step 395; if all preconditions are true, the workcell management system proceeds to step 350.

In step 350, the workcell management system causes components of the workcell to execute the skill(s) described in the skill bundle received from the skill bundle distribution system in step 310.

In step 355, the workcell management system evaluates the effects. As with preconditions, effects can be expressed as assertions. For example, "ArmPosition=Horizontal" can indicate that, after performing the skill, a robot arm is horizontal in reference to a given axis; "ItemGripped=TRUE" can indicate that an item has successfully be gripped; and so on. The system evaluates each effect against the current status of the relevant components in the workcell.

In optional decision step 360, the workcell management system can determine whether the effects are true. If at least one effect is not true, the system can proceed to step 395; if all effects are true, the workcell management system can proceed to step 370.

In optional step 370, the workcell management system can generate a success indicator. A success indicator can be a value associated with success made available by the workcell management system over an interface such as a web services call.

In optional step 395, the workcell management system can generate an error indicator. An error indicator can be a value associated with an error made available by the workcell management system over an interface such as a web services call. Optionally, the workcell management system can also include information about the nature of the error, such as which precondition(s) or effect(s) were not satisfied. The workcell management system can also provide the error indicator to the skill bundle distribution system.

FIG. 4 is a block diagram of an example skill bundle chain. A skill bundle chain is an ordered group of skill bundles, S(1) . . . S(N), where the effect of skill bundle S(i) matches the precondition of skill bundle S(i+1). The precondition of the skill bundle chain is the precondition of skill bundle S(1) and the effect of the skill bundle chain is the effect of skill bundle S(N).

For example, a skill bundle chain to insert a connector starting with a robot arm beginning in its origin position (that is, the precondition is the robot arm in its origin position) and the resulting in a connector being inserted (that is, the effect is connector inserted) can include two skill bundles: (i) a skill bundle with a precondition that the robot arm is in its origin position and an effect that the robot arm is aligned with the connector slot, and (ii) a skill bundle with a precondition that the robot arm is aligned with the connector slot and an effect that the connector is inserted.

A skill bundle distribution system 405, such as the skill bundle distribution system illustrated in FIG. 1, can receive a request for a skill bundle 410a that contains certain preconditions 420a and effects 430a. In this example, the skill registry 407 within the skill bundle distribution system 405 does not contain a skill bundle matching both the preconditions 420a and the effects 430a.

However, in this example the skill registry 407 does contain a set of skill bundles that, in aggregate, match both the preconditions 420a and the effects 430a. Specifically, in this example, skill bundle 410b contains preconditions 420b that match the preconditions 410a from skill bundle 410a. Further, the effects 430b of skill bundle 410b match the preconditions 420c of skill bundle 410c. Next, the effects 430c of skill bundle 410c match the preconditions 420d of skill bundle 410d. Finally, the effects of skill bundle 410d match the effects 430a of the requested skill bundle 410a.

Thus, the chain of skill bundles 410b, 410c, 410d matches the preconditions 420a and effects 430a of the requested skills bundle 410a, and therefore the skill bundle distribution system 405 can return that chain of skills bundles as matching the requirements of the request.

To create skill bundle chains, the skill bundle distribution system 405 can search for appropriate chained skills bundles by performing an exhaustive search of the skills bundles in the registry. For example, the skill bundle distribution system 405 can begin by searching for a skills bundle that matches the requested preconditions 420a. Upon finding an appropriate candidate match, the skill bundle distribution system can attempt to match the effects of the candidate match to the preconditions of a second skills bundle. This skill bundle distribution system 405 can continue this process until either an appropriate effect 430a is found or all combinations of skills bundles in the skills registry 407 has been exhausted with no match found.

Alternatively, the skill bundle distribution system 405 can build a graph representation of the skills bundles in the skills registry 407. The skill bundle distribution system can create nodes in the graph to represent each skills bundles. The skill bundle distribution system can then create directed edges in the graph, where each directed edge represents a match from an effect associated with a skills bundle (represented in the graph as a node) to a precondition of a second skills bundle (also represented in the graph as a node).

To search for an appropriate chain of skills bundles, the skill bundle distribution system can begin by enumerating each node that has a precondition matching the requested precondition. Such nodes can be call "root nodes." The skill bundle distribution system can then enumerate each node that has an effect matching the requested effect, called "exit nodes." The skill bundle distribution system can then search the graph to determine whether a path exists through the edges in the graph from at least one root node to at least one exit node. If the skill bundle distribution system determines that a path exists, the skill bundle distribution system can identify the nodes in the path, and return the associated skills bundles.

Alternatively, instead of enumerating each root node and each exit node, the skill bundle distribution system can test a first node, and upon not finding an appropriate chain to an exit node, find and test a second root node, continuing until a chain to an exit node is found or no new root nodes exist.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving, from a skill developer, data for a skill bundle, the data comprising:
a definition of one or more preconditions for a robotic system to execute a skill,
one or more effects to an operating environment after the robotic system has executed the skill, and
software module implementing the skill, wherein the software module defines a state machine of subtasks;
generating a skill bundle from the data received from the skill developer;
adding the data identifying the generated skill bundle to a skill registry;
receiving, from a robot execution system, a request for a skill, the request specifying data in the skill registry; and
providing, to the execution robot system, the skill bundle for installation on the robot execution system.

Embodiment 2 is the method of embodiment 1 further comprising:
receiving, by a distribution system, a query that requests skills having a particular effect;
searching descriptions of effects associated with skills in the skill registry;
identifying a first skill bundle that satisfies the query; and
providing information identifying the skill bundle in response to receiving the query.

Embodiment 3 is the method of any one of embodiments 1-2 further comprising:
receiving, by the robot execution system, an input program that references one or more skill bundles; and
executing, by the robot execution system, at least one software module implementing a skill included in the one or more skill bundles referenced by the input program.

Embodiment 4 is the method of embodiment 3 further comprising:
determining, by the robot execution system, one or more skill bundles referenced by the input program;
identifying, by the robot execution system, a skill bundle among the one or more skill bundles determined to be referenced by the input program that is not downloaded to the robot execution system;
in response to determining that an identified skill bundle is not downloaded to the robot execution system, downloading, by the robot execution system, the identified skill bundle.

Embodiment 5 is the method of any one of embodiments 1-4 further comprising:
receiving, by the robot execution system, an input program that references a plurality of skill bundles, including a first skill bundle specifying a particular result and a second skill bundle having a precondition that references the particular result; and
executing, by the robot execution system, at least one software module specified by the plurality of skill bundles.

Embodiment 6 is the method of embodiment 5 further comprising:
executing, by the robot execution system, the first skill using a first skill template of the first skill bundle;
determining, by the robot execution system, that a result of the first skill satisfies the precondition of the second skill bundle; and
in response, transitioning, by the robot execution system, from executing the first skill to executing the second skill according to the input program.

Embodiment 7 is the method of any one of embodiments 1-6 wherein the skill bundle includes a reference to at least one software module capable of completing at least one of the subtasks.

Embodiment 8 is the method of any one of embodiments 1-7 wherein the skill bundle includes at least a first skill bundle and a second skill bundle.

Embodiment 9 is the method of embodiment 8 further comprising:
executing, by the robot execution system, a first software module included in the first skills bundle;
in response to executing, by the robot execution system the first software module, executing, by the robot execution system, a second software module included in the second skills bundle.

Embodiment 10 is a computer storage medium encoded with a computer program, the program comprising instructions that are operable, when executed by data processing apparatus, to cause the data processing apparatus to perform the method of any one of embodiments 1 to 9.

Embodiment 11 is a system comprising: one or more computers and one or more storage devices storing instructions that are operable, when executed by the one or more computers, to cause the one or more computers to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving, from a plurality of skill developers, data for a plurality of respective skill bundles, the data for each skill comprising:
    a definition of one or more preconditions of a physical operating environment that must hold before a robotic system can execute a skill for the skill bundle,
    one or more effects to the operating environment after the robotic system has executed the skill, and
    a software module implementing the skill, wherein the software module defines a state machine of subtasks;
generating a respective skill bundle from the data received from each of the plurality of skill developers;
adding the data identifying the generated skill bundles to a skill registry;
receiving, from a robot execution system, a request for a skill, the request specifying data in the skill registry;
providing, to the robot execution system in response to the request, a first skill bundle for the skill for installation on the robot execution system, wherein the first skill bundle is generated by a first skill developer;
providing, to the robot execution system, a second skill bundle generated by a different second skill developer; and
receiving, by the robot execution system, an input program that references a plurality of skill bundles generated by multiple different skill developers, including the first skill bundle specifying a particular effect and the second skill bundle, wherein the second skill bundle includes a precondition that references the particular effect of the first skill bundle;
executing, by the robot execution system on a physical robot, a robotic process including:
    determining that the one or more preconditions of the first skill bundle hold for an operating environment of the physical robot, and
    in response, executing the skill of the first skill bundle including executing the state machine of subtasks on the physical robot;
    determining, by the robot execution system, that an effect of the skill satisfies the precondition of the second skill bundle, and
    in response, transitioning, by the robot execution system, from executing the skill to executing a second skill of the second skill bundle according to the input program.

2. The method of claim 1, further comprising:
receiving, by a distribution system, a query that requests skills having a particular effect;
searching descriptions of effects associated with skills in the skill registry;
identifying a first skill bundle that satisfies the query; and
providing information identifying the skill bundle in response to receiving the query.

3. The method of claim 1, further comprising:
receiving, by the robot execution system, an input program that references one or more skill bundles; and
executing, by the robot execution system, at least one software module implementing a skill included in the one or more skill bundles referenced by the input program.

4. The method of claim 3, further comprising:
determining, by the robot execution system, one or more skill bundles referenced by the input program;
identifying, by the robot execution system, a skill bundle among the one or more skill bundles determined to be referenced by the input program that is not downloaded to the robot execution system; and
in response to determining that an identified skill bundle is not downloaded to the robot execution system, downloading, by the robot execution system, the identified skill bundle.

5. The method of claim 1, further comprising:
receiving, by the robot execution system, an input program that references a plurality of skill bundles, including the skill bundle specifying a particular effect and a second skill bundle having a precondition that references the particular effect; and
executing, by the robot execution system, at least one software module specified by the plurality of skill bundles.

6. The method of claim 5, further comprising:
determining, by the robot execution system, that an effect of the skill satisfies the precondition of the second skill bundle; and
in response, transitioning, by the robot execution system, from executing the skill to executing a second skill of the second skill bundle according to the input program.

7. The method of claim 1, wherein the skill bundle includes a reference to at least one software module capable of completing at least one of the subtasks.

8. The method of claim 1, wherein the skill bundle is part of a skill bundle chain that includes at least the skill bundle and a second skill bundle.

9. The method of claim 8, further comprising executing, by the robot execution system, a plurality of skills in the skill bundle chain, wherein at least one effect of the skill bundle satisfies at least one precondition of the second skill bundle, including:
executing, by the robot execution system, a first software module included in the skill bundle; and
in response to executing, by the robot execution system the first software module, executing, by the robot execution system, a second software module included in the second skill bundle.

10. One or more non-transitory computer-readable storage media storing instructions that when executed by one or more computers cause the one or more computers to perform operations comprising:

receiving, from a plurality of skill developers, data for a plurality of respective skill bundles, the data for each skill comprising:
- a definition of one or more preconditions of a physical operating environment that must hold before a robotic system can execute a skill for the skill bundle,
- one or more effects to the operating environment after the robotic system has executed the skill, and
- a software module implementing the skill, wherein the software module defines a state machine of subtasks;

generating a respective skill bundle from the data received from each of the plurality of skill developers;

adding the data identifying the generated skill bundles to a skill registry;

receiving, from a robot execution system, a request for a skill, the request specifying data in the skill registry;

providing, to the robot execution system in response to the request, a first skill bundle for the skill for installation on the robot execution system, wherein the first skill bundle is generated by a first skill developer;

providing, to the robot execution system, a second skill bundle generated by a different second skill developer; and receiving, by the robot execution system, an input program that references a plurality of skill bundles generated by multiple different skill developers, including the first skill bundle specifying a particular effect and the second skill bundle, wherein the second skill bundle includes a precondition that references the particular effect of the first skill bundle;

executing, by the robot execution system on a physical robot, a robotic process including:
- determining that the one or more preconditions of the first skill bundle hold for an operating environment of the physical robot, and
- in response, executing the skill of the first skill bundle including executing the statement of subtasks on the physical robot;
- determining, by the robot execution system, that an effect of the skill satisfies the precondition of the second skill bundle, and
- in response, transitioning, by the robot execution system, from executing the skill to executing a second skill of the second skill bundle according to the input program.

11. The one or more non-transitory computer-readable storage media of claim 10 further comprising:
receiving, by a distribution system, a query that requests skills having a particular effect;
searching descriptions of effects associated with skills in the skill registry;
identifying a first skill bundle that satisfies the query; and
providing information identifying the skill bundle in response to receiving the query.

12. The one or more non-transitory computer-readable storage media of claim 10 further comprising:
receiving, by the robot execution system, an input program that references one or more skill bundles; and
executing, by the robot execution system, at least one software module implementing a skill included in the one or more skill bundles referenced by the input program.

13. The one or more non-transitory computer-readable storage media of claim 12, further comprising:
determining, by the robot execution system, one or more skill bundles referenced by the input program;
identifying, by the robot execution system, a skill bundle among the one or more skill bundles determined to be referenced by the input program that is not downloaded to the robot execution system; and
in response to determining that an identified skill bundle is not downloaded to the robot execution system, downloading, by the robot execution system, the identified skill bundle.

14. The one or more non-transitory computer-readable storage media of claim 10, further comprising:
receiving, by the robot execution system, an input program that references a plurality of skill bundles, including the skill bundle specifying a particular effect and a second skill bundle having a precondition that references the particular effect; and
executing, by the robot execution system, at least one software module specified by the plurality of skill bundles.

15. The one or more non-transitory computer-readable storage media of claim 14, wherein the operations further comprise:
determining, by the robot execution system, that an effect of the skill satisfies the precondition of the second skill bundle; and
in response, transitioning, by the robot execution system, from executing the skill to executing a second skill of the second skill bundle according to the input program.

16. The one or more non-transitory computer-readable storage media of claim 10, wherein the skill bundle includes a reference to at least one software module capable of completing at least one of the subtasks.

17. The one or more non-transitory computer-readable storage media of claim 10, wherein the skill bundle is part of a skill bundle chain that includes at least the skill bundle and a second skill bundle.

18. The one or more non-transitory computer-readable storage media of claim 17, wherein the operations further comprise executing, by the robot execution system, a plurality of skills in the skill bundle chain, wherein at least one effect of the skill bundle satisfies at least one precondition of the second skill bundle, including:
executing, by the robot execution system, a first software module included in the skill bundle; and
in response to executing, by the robot execution system the first software module, executing, by the robot execution system, a second software module included in the second skill bundle.

19. A system comprising one or more computers and one or more storage devices storing instructions that when executed by the one or more computers cause the one or more computers to perform operations comprising:
receiving, from a plurality of skill developers, data for a plurality of respective skill bundles, the data for each skill comprising:
- a definition of one or more preconditions of a physical operating environment that must hold before a robotic system can execute a skill for the skill bundle,
- one or more effects to the operating environment after the robotic system has executed the skill, and
- a software module implementing the skill, wherein the software module defines a state machine of subtasks;

generating a respective skill bundle from the data received from each of the plurality of skill developers;

adding the data identifying the generated skill bundles to a skill registry;

receiving, from a robot execution system, a request for a skill, the request specifying data in the skill registry;

providing, to the robot execution system in response to the request, a first skill bundle for the skill for installation on the robot execution system, wherein the first skill bundle is generated by a first skill developer;

providing, to the robot execution system, a second skill bundle generated by a different second skill developer; and receiving, by the robot execution system, an input program that references a plurality of skill bundles generated by multiple different skill developers, including the first skill bundle specifying a particular effect and the second skill bundle, wherein the second skill bundle includes a precondition that references the particular effect of the first skill bundle;

executing, by the robot execution system on a physical robot, a robotic process including:

determining that the one or more preconditions of the first skill bundle hold for an operating environment of the physical robot, and in response, executing the skill of the first skill bundle including executing the statement of subtasks on the physical robot;

determining, by the robot execution system, that an effect of the skill satisfies the precondition of the second skill bundle, and in response, transitioning, by the robot execution system, from executing the skill to executing a second skill of the second skill bundle according to the input program.

20. The system of claim 19, further comprising:

receiving, by a distribution system, a query that requests skills having a particular effect;

searching descriptions of effects associated with skills in the skill registry;

identifying a first skill bundle that satisfies the query; and providing information identifying the skill bundle in response to receiving the query.

\* \* \* \* \*